United States Patent [19]

Breyer

[11] Patent Number: 5,215,114
[45] Date of Patent: Jun. 1, 1993

[54] SAFETY VALVE

[75] Inventor: Karl Breyer, Ingelfingen, Fed. Rep. of Germany

[73] Assignee: Herion-Werke KG, Fellbach, Fed. Rep. of Germany

[21] Appl. No.: 781,826

[22] Filed: Oct. 23, 1991

[30] Foreign Application Priority Data

Nov. 28, 1990 [DE] Fed. Rep. of Germany ....... 4037905

[51] Int. Cl.⁵ ............................................. F16K 17/04
[52] U.S. Cl. ................................................. 137/469
[58] Field of Search .............. 137/469, 493, 614.11

[56] References Cited

U.S. PATENT DOCUMENTS

| | | | |
|---|---|---|---|
| 1,629,637 | 5/1927 | Price | 137/493 X |
| 2,069,645 | 2/1937 | Cardew | 137/469 |
| 2,227,578 | 1/1941 | Fraser | 137/469 |
| 3,841,350 | 10/1974 | Griensteidl et al. | 137/516.27 |
| 3,999,898 | 12/1976 | Chomczyk et al. | 137/512.1 X |
| 4,030,522 | 6/1977 | Heiser | 137/469 X |
| 4,064,906 | 12/1977 | Berg | 137/469 X |
| 4,077,781 | 3/1978 | Sundström | 137/625.65 X |
| 5,049,008 | 9/1991 | Baillie | 137/469 |

FOREIGN PATENT DOCUMENTS 1318596  1/1963  France ............................. 137/469

Primary Examiner—Stephen M. Hepperle
Attorney, Agent, or Firm—Henry M. Feiereisen

[57] ABSTRACT

A safety valve for preventing overpressure in plants operating with gaseous and/or vaporous and/or liquid fluids and/or mixtures includes a valve body with a valve seat and a valve member which controls the valve seat and includes a seat valve and a valve piston securely fixed to the seat valve at a distance thereto.

6 Claims, 5 Drawing Sheets

SAFETY VALVE

BACKGROUND OF THE INVENTION

The present invention refers to a safety valve, and in particular to a pressure relief valve of the type having a valve body with inlet and outlet, a valve seat and a valve member which is spring-loaded in closing direction of the valve seat, for preventing overpressure in plants operating with gaseous and/or vaporous and/or liquid fluids and/or mixtures.

Safety valves of this type are used for example for protection of containers and plants from excessive overpressure by preventing gases, vapors, overheated or undercooled liquids, e.g. water, during simultaneous or successive change between different states of aggregation from exceeding set pressures.

In industrial steam generation plants, a safety valve of this type can be utilized as a pilot valve for use with pressure relief valves operated by a separate fluid system, or directly in smaller plants for protection from excess pressure.

For these applications, spring-loaded pressure relief valves are known which are equipped with auxiliary means for supporting the stroke or lift, e.g. baffle plates, stroke bells (curved baffle plates), or also mechanical expansion bellows. Because of the fact that at critical relief of compressible fluids and variable counterpressures the static pressures change at discharge velocities near sound level to very low absolute pressures, variations of flow conditions cause conventional safety valves to significantly oscillate during occurrence of counterpressures. The use of additional mechanical or hydraulic cushioning devices for compensating an oscillation of the safety valve could not solve this problem.

SUMMARY OF THE INVENTION

It is thus an object of the present invention to provide an improved safety valve obviating the afore-stated drawbacks.

In particular, it is an object of the present invention to provide an improved safety valve in which the tendency for oscillation is eliminated or at least significantly reduced, even during occurrence of varying counterpressures.

These objects and others which will become apparent hereinafter are attained in accordance with the present invention by providing the valve member with a seat valve, and with a valve piston which is securely fixed to the seat valve. Suitably, the valve piston is spaced from the seat valve in flow direction of the fluid.

Through the provision of such a safety valve, the function of sealing the valve and control of the fluid flow through the valve is carried out by different and distinct elements, with the sea valve providing the sealing action by engaging the valve seat, and with the valve piston controlling the fluid flow through the valve member by cooperating with a control edge which is defined by a sleeve by which the valve piston is supported in sliding fit. Thus, the valve seat is subjected primarily to static pressure so that erosion, cavitation or drop beating in the area of the valve seat and valve cone are essentially eliminated, and the safety valve according to the invention is not influenced by counterpressure and mass flow rate. High counterpressures proportionally increase the opening path so that the safety valve in accordance with the present invention is directly usable for control of large scale valves and also for monitoring pressure vessels.

A safety valve in accordance with the present invention responds only to overpressure in the container but is essentially independent of pressure conditions, state of aggregation and density of the fluid.

Suitably, the sleeve is provided with a ring channel which surrounds the valve piston, and with at least one cross bore by which the ring channel is connected to the outlet.

According to a further feature of the present invention, the outlet of the safety valve is provided with a relief nozzle to create essentially static condition in the annular passageway between the valve piston and the ring channel and to avoid the occurrence of cavitation in this area.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
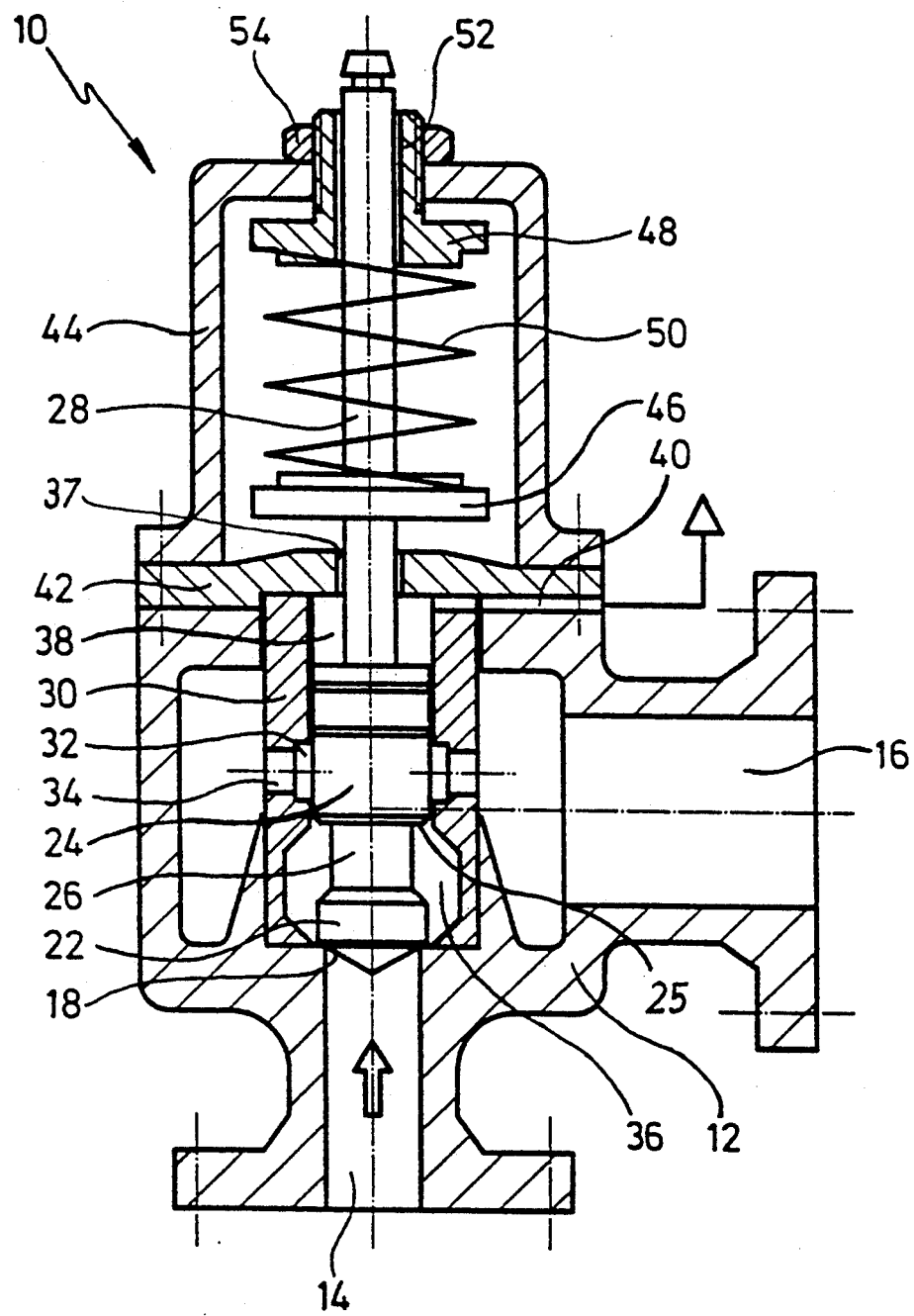
FIG. 1 is a partly longitudinal section of one embodiment of a safety valve according to the present invention, illustrating the safety valve in closed position.

Throughout all the Figures, the same or corresponding elements are always indicated by the same reference numerals.

Referring now to the drawing and in particular to FIG. 1, there is shown a partly longitudinal section of one embodiment of a safety valve according to the present invention, generally designated by reference numeral 10 and including a valve body 12 provided with a fluid inlet 14 at one end and a fluid outlet 16 at one side, which in the nonlimiting example of FIG. 1, extends perpendicular to the inlet 14. The valve body 12 defines a valve seat 18 controlled by the actual valve member which includes a seat valve with a tapered plug or valve cone 22 by which the seat 18 is opened and closed, and a valve piston 24 which is securely fixed to the plug 22 via an intermediate shaft 26 so as to be spaced therefrom in flow direction of the fluid. Extending axially upwards from the plug-distant side of the valve piston 24 is a valve stem 28 which projects through a bonnet 42 into a spring box 44. Suitably, plug 22 shaft 26, valve piston 24 and valve stem 28 are made of one piece.

Fitted within the valve body 12 is a sleeve 30 by which the valve piston 24 is guided for axial displacement. In the area of the piston 24, the sleeve 30 is provided with a ring channel 32 which surrounds the piston 24 and communicates with the outlet 16 via at least one cross bore 34 radially extending from the ring channel 32 within the sleeve 30. Preferably, the sleeve 30 includes more than one cross bore 34 to provide communication between the ring channel 32 and the outlet 16.

Figure 3:
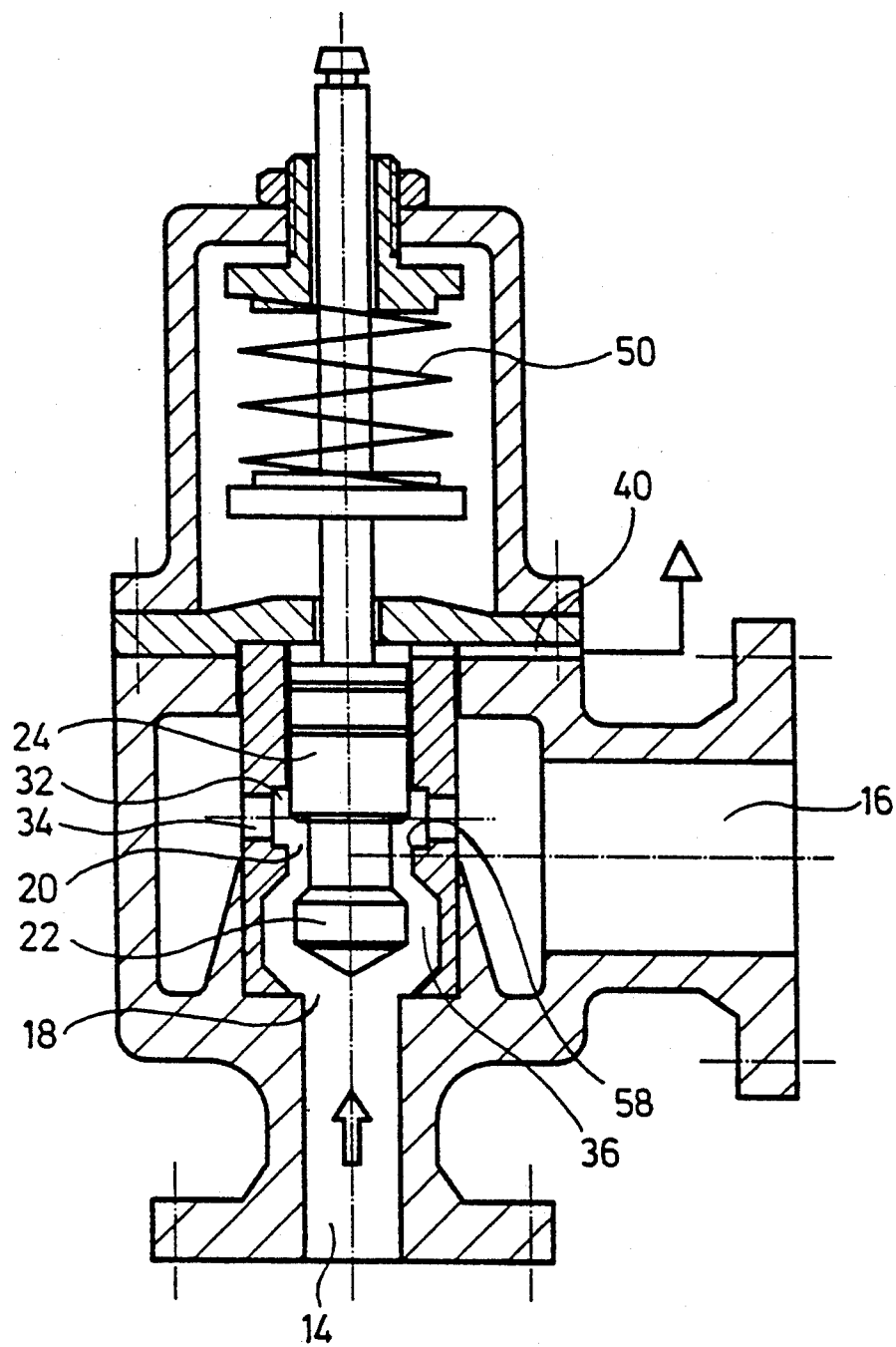
FIG. 3 is a partly longitudinal section of the safety valve of FIG. 1 in fully opened position.

As shown in FIG. 1, the sleeve 30 bears with its upper end against a shoulder of the bonnet 42, with its other end being supported by the valve seat 18 of the valve body 12. In the area between the ring channel 32 and the valve seat 18, the sleeve 30 is of C-shaped configuration so as to define a chamber 36. At its junction to the ring channel 32, the sleeve 30 defines a control edge 58 which cooperates with the valve piston 24 to control an annular passageway 20 (FIG. 3). A further chamber 38 is defined by the sleeve 30 between the upper side of the piston 24 and the facing side of the bonnet 42 and is in communication via a channel 40 with the atmosphere for ventilation during switching of the valve member.

The bonnet 42 is suitably secured to the body 12 e.g. by screws as indicated by dashdot lines and serves not only for axial securement of the sleeve 30 but also for limiting the valve lift.

As further shown in FIG. 1, the valve stem 28 traverses a central bore 37 in the bonnet 42 to enter the spring box 44 which is suitably mounted with its lower end to the bonnet 42 e.g. by means of screws. Although not shown in the drawing, it will be appreciated by persons skilled in the art that leakage of fluid through the central bore 37 is avoided by providing a suitable seal e.g. a O-ring between the valve stem 28 and the bonnet 42.

Housed in the spring box 44 is a valve spring 50, e.g. a helical compression spring, which concentrically surrounds the valve stem 28 between a lower spring plate 46 which is suitably secured to the valve stem 28 and an upper spring retainer 48 which is provided with a threaded connection 52 by which the spring retainer 48 is threadably engageable in a complementary central threaded bore in the top of the spring box 44 and secured by a counter nut 54. In this manner, the spring retainer 48 can be selectively positioned within the spring box 44 so as to allow selective adjustment of the spring tension and thus of the responsiveness or set pressure of the safety valve 10.

After having described the individual parts of a safety valve in accordance with the present invention, its mode of operation will now be set forth.

FIG. 1 shows the safety valve 10 in closed position in which the head portion of the plug 22 rests in the valve seat 18 and the valve piston 24 projects past the control edge 58 to seal off passageway 20. As soon as the line pressure in inlet 14 reaches the preset pressure of the spring 50, the sealing action at valve seat 18 diminishes so that fluid seeps from the inlet 14 into the chamber 36 between the valve member and the sleeve 30 to fill the chamber 36.

Figure 2:
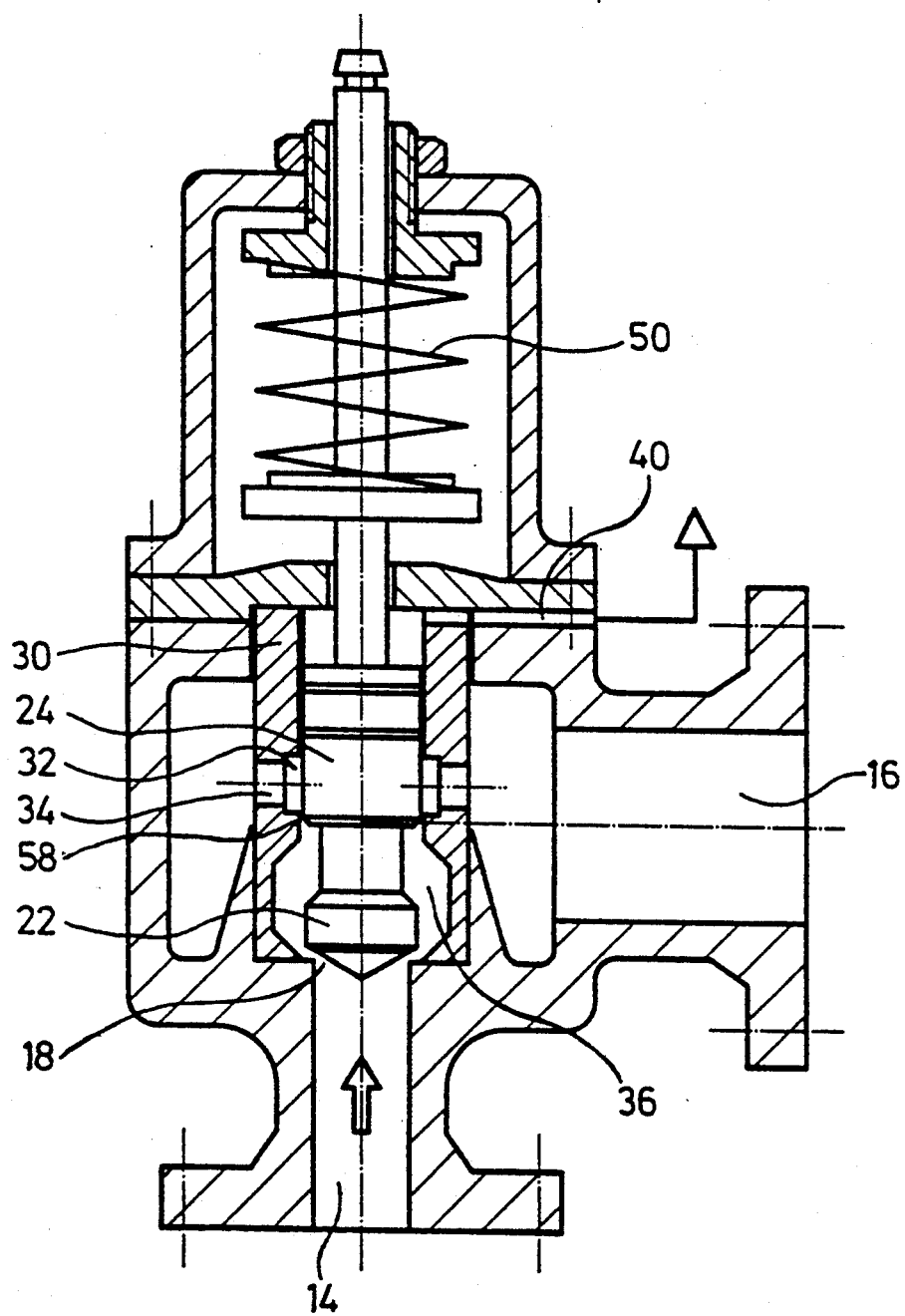
FIG. 2 is a partly longitudinal section of the safety valve of FIG. 1 in partially open position.

Since the piston 24 has a greater diameter than the valve seat 18, an annular surface 25 is generated which is acted upon by the fluid within the chamber 36 so that the plug 22 is urged to retract from the valve seat 18 as shown in FIG. 2. In this position, the valve seat 18 is open while the annular passageway 20 is still closed by the piston 24 as the piston 24 is positioned past the control edge 58. The increasing inflow of fluid and thus the increasing pressure upon the valve piston 24, however, forces the latter upwards in axial direction until the piston 24 moves upwards away from the control edge 58 to open the annular passageway 20, as shown in FIG. 3. Fluid thus can flow through the chamber 36 past the annular passageway 20 into the ring channel 32 and cross bores 34 and exit through outlet 16. Fluid is thus relieved in the area of the passageway 20, ring channel 32 and cross bores 34. During the upstroke of the valve stem 28, the air cushion prevailing in chamber 38 escapes through channel 40 for avoiding an impediment to the movement of the valve member.

In case the line pressure in inlet 14 drops to or below the set pressure, the valve stem 28 is forced downwards by the valve spring 50 toward the valve seat 18. However, before the plug 22 reaches the valve seat 18, the piston 24 slides past the control edge 58 so as to close the annular passageway 20. Flow of fluid through the valve member is thus reduced to nearly zero so that the valve spring 50 urges the valve stem 28, at practically still flow, further downwards until the valve seat 18 is closed by the plug 22. Thereafter, the residual pressure within chamber 36 is eliminated via the existing radial clearance between the piston 24 and the sleeve 30. Simultaneous with the downstroke of the valve stem 28, air is drawn into chamber 38 through channel 40 to prevent formation of underpressure and of a suction effect.

Figure 4:
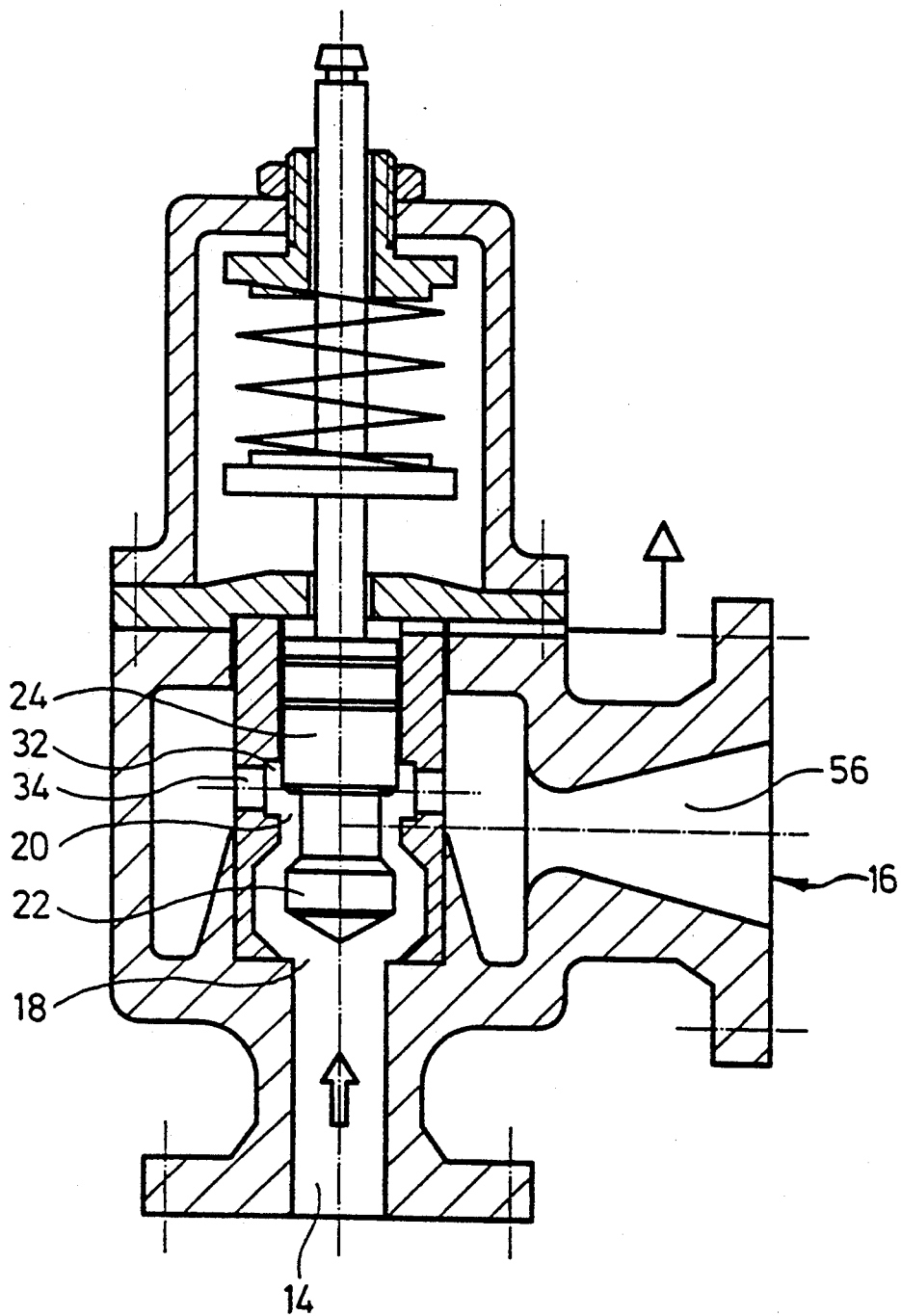
FIG. 4 is a partly longitudinal section of the safety valve of FIG. 1 in fully opened position, in combination with a relief nozzle.

Turning now to FIG. 4, there is shown a partly longitudinal section of the safety valve 10 in fully opened position according to FIG. 3, in combination with a relief nozzle 56, e.g. a Laval nozzle, which is provided in outlet 16. In this manner, fluid is relieved only in the nozzle 56 which means that static conditions prevail and no cavitation is encountered in the annular passageway 20 and also in the area of the ring channel 32 and cross bores 34.

Figure 5:
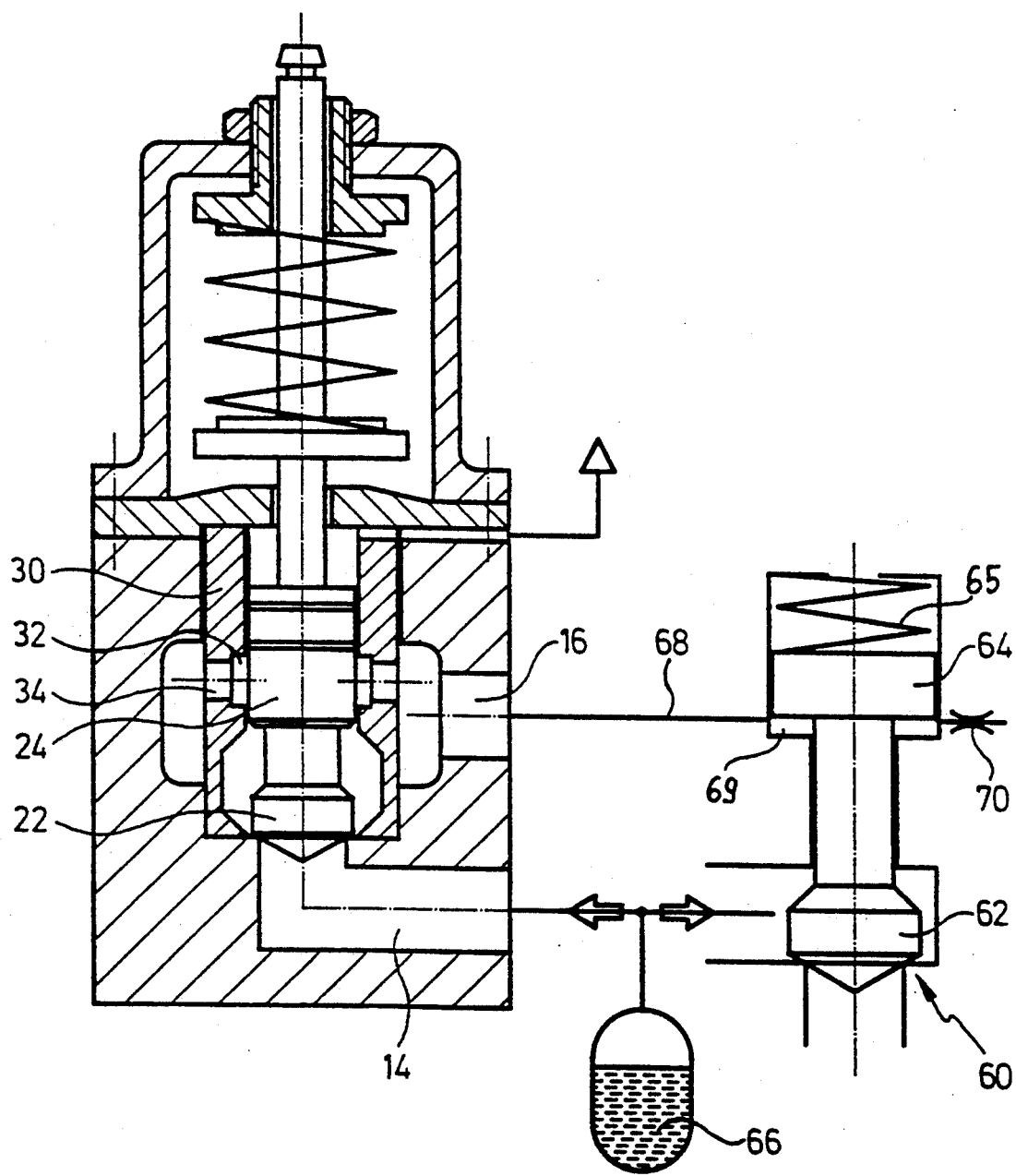
FIG. 5 is a partly longitudinal section of the safety valve of FIG. 1 in closed position, with the safety valve being used as pilot valve for controlling a separate pressure relief valve.

FIG. 5 shows a nonlimiting example of one application of the safety valve 10 in accordance with the present invention. In this example, the safety valve 10 is shown in closed position and assumes the function of a pilot valve for controlling a separate pressure relief valve 60 of the type including a valve cone 62 which is acted upon by a spring-loaded piston 64 to control a valve seat. The valve 60 as well as the inlet 14 are connected to a pressure maintaining device in form of a pressure vessel 66.

When pressure in the pressure vessel 66 reaches or exceeds the set pressure of the safety valve 10, the latter opens as set forth above. Outlet 16 of the safety valve 10 is connected via line 68 with a chamber 69 below the actuating piston 64 so that fluid entering chamber 69 causes the piston 64 to move upwards against the pressure exerted by the spring 65. Thus, plug 62 clears the valve seat to open the valve.

When the pressure drops below a certain level, the safety valve 10 closes, and fluid within chamber 69 can exit via a throttle 70 to allow the actuating piston 64 to move downwards until plug 62 engages the valve seat to close the valve.

While the invention has been illustrated and described as embodied in a safety valve it is not intended to be limited to the details shown since various modifications and structural changes may be made without departing in any way from the spirit of the present invention.

What is claimed as new and desired to be protected by Letters Patent is set forth in the appended claims.

I claim:

1. A safety valve, in particular for preventing overpressure in plants operating with gaseous and/or vaporous and/or liquid fluids and/or mixtures, comprising:

a valve body with an inlet, an outlet and a fluid passageway communicating therebetween, said valve body including a valve seat arranged in said passageway between said inlet and said outlet;

a spring-loaded valve member guided for axial displacement in said valve body and including a seat valve regulating the fluid flow through said valve seat and a valve piston fixedly secured to said seat valve for regulating the fluid flow through said outlet, said valve piston being spaced from said seat valve in flow direction of the fluid such as to define a chamber therebetween, with said valve piston being provided with an annular surface which is acted upon by fluid in said chamber; and a Laval nozzle provided in said outlet for relieving the fluid.

2. A safety valve as defined in claim 1 wherein said valve piston has a diameter and said valve seat has a diameter, said diameter of said valve piston being greater than the diameter of said valve seat for providing said annular surface.

3. A safety valve as defined in claim 1, and further comprising a sleeve fitted in said valve body for guiding said valve piston in axial direction, said sleeve being provided with a ring channel surrounding said valve piston, and with at least one radially extending cross bore for connecting said ring channel with said outlet.

4. A safety valve as defined in claim 4 wherein said ring channel is provided with a control edge cooperating with said valve piston.

5. A safety valve as defined in claim 1 wherein said valve body is provided with a passageway communicating with the atmosphere for pressure relief at the seat valve distant side of said valve piston.

6. A safety valve as defined in claim 3 wherein said sleeve defines an annular passageway in the area of said valve piston, with the fluid being relieved at said annular passageway.

* * * * *